United States Patent
Schruellkamp

(10) Patent No.: US 8,326,581 B2
(45) Date of Patent: Dec. 4, 2012

(54) CRASH SENSOR AND METHOD FOR PROCESSING AT LEAST ONE MEASURING SIGNAL

(75) Inventor: Michael Schruellkamp, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 421 days.

(21) Appl. No.: 12/303,516

(22) PCT Filed: Sep. 6, 2007

(86) PCT No.: PCT/EP2007/059335
§ 371 (c)(1),
(2), (4) Date: Apr. 8, 2009

(87) PCT Pub. No.: WO2008/043616
PCT Pub. Date: Apr. 17, 2008

(65) Prior Publication Data
US 2010/0010778 A1      Jan. 14, 2010

(30) Foreign Application Priority Data

Oct. 9, 2006   (DE) .......................... 10 2006 047 632

(51) Int. Cl.
*H03F 1/26* (2006.01)
(52) U.S. Cl. ..................................... 702/189
(58) Field of Classification Search ............ 702/189
See application file for complete search history.

(56) References Cited

U.S. PATENT DOCUMENTS

| | | | | |
|---|---|---|---|---|
| 4,689,766 A * | 8/1987 | Kent | ............................... | 714/23 |
| 5,712,969 A * | 1/1998 | Zimmermann et al. | ....... | 714/5.1 |
| 5,802,480 A * | 9/1998 | Shiraishi | ........................ | 701/45 |
| 6,396,427 B1 * | 5/2002 | Mattes et al. | ................. | 341/139 |
| 6,981,565 B2 * | 1/2006 | Gleacher | ....................... | 180/282 |
| 7,159,107 B2 * | 1/2007 | Chen et al. | ........................ | 713/2 |
| 2003/0168839 A1 * | 9/2003 | Miyoshi | ........................ | 280/735 |
| 2006/0025912 A1 * | 2/2006 | Haering et al. | ................. | 701/45 |
| 2006/0111862 A1 | 5/2006 | Otterbach et al. | | |
| 2007/0101191 A1 * | 5/2007 | Iwama | ............................. | 714/15 |
| 2007/0180318 A1 * | 8/2007 | Morozumi | ..................... | 714/23 |
| 2008/0133968 A1 * | 6/2008 | Muppirala et al. | ............. | 714/13 |

FOREIGN PATENT DOCUMENTS

| | | |
|---|---|---|
| DE | 31 33 304 | 3/1983 |
| DE | 101 48 029 | 4/2003 |
| DE | 102 37 162 | 2/2004 |
| JP | 58-46411 | 3/1983 |
| JP | 11321493 A * | 11/1999 |

OTHER PUBLICATIONS

International Search Report, PCT/EP2007/059335, dated Mar. 12, 2008.

* cited by examiner

*Primary Examiner* — Cindy H Khuu
*Assistant Examiner* — Timothy H Hwang
(74) *Attorney, Agent, or Firm* — Kenyon & Kenyon LLP

(57) ABSTRACT

In a crash sensor and a method for processing a measured value of the crash sensor, at least one measured quantity is detected by a sensor element and a first rewritable memory is provided in which first data for influencing the processing of the at least one measured quantity are stored. In addition, a second hardwired memory is provided in which second data for influencing the processing are stored. A logic module is provided which loads the first or second data, as a function of a test of the first memory, for processing the at least one measured quantity.

8 Claims, 3 Drawing Sheets

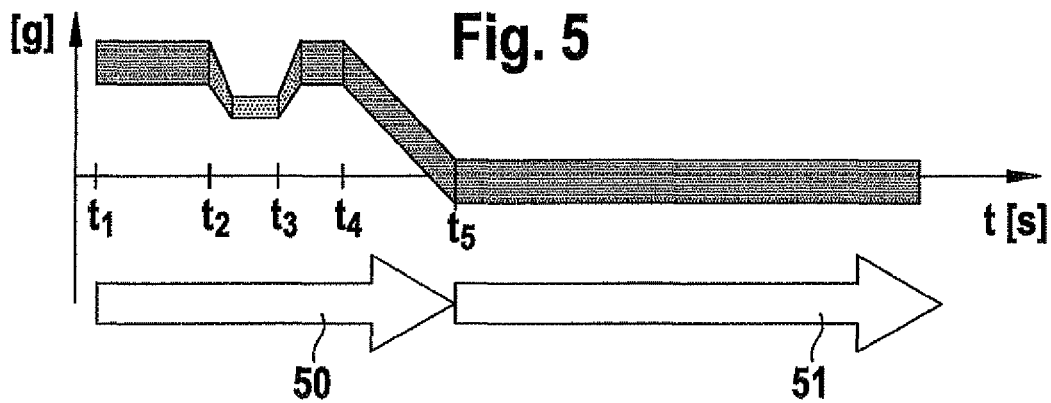
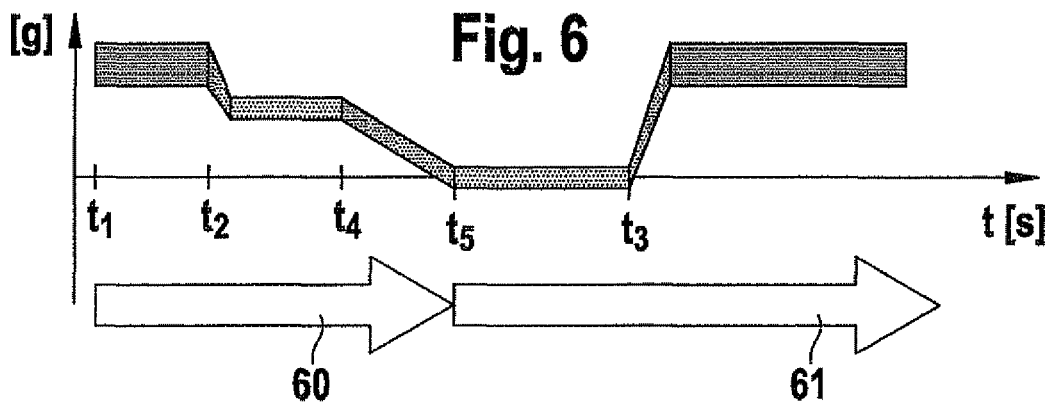
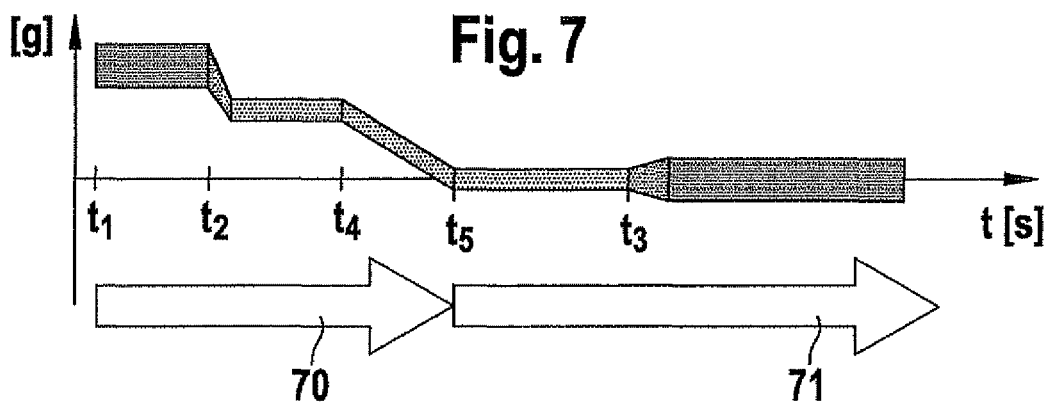

CRASH SENSOR AND METHOD FOR PROCESSING AT LEAST ONE MEASURING SIGNAL

CROSS-REFERENCE TO RELATED APPLICATIONS

This is a U.S. national stage of International Application No. PCT/EP07/59335, filed on Sep. 6, 2007. Priority is claimed on German Application No. 10 2006 047 632.8, filed on Oct. 9, 2006.

FIELD OF THE INVENTION

The present invention relates to a crash sensor and a method for processing at least one measuring signal.

BACKGROUND INFORMATION

DE 102 37 162 describes a sensor element which delivers a measured value, which is amplified and digitized. This measured value is subjected to pre-processing.

SUMMARY

The crash sensor according to example embodiments of the present invention and the method according to example embodiments of the present invention for processing at least one measuring signal having the features described herein have the advantage over conventional arrangements in that a rewritable memory, preferably an EEPROM, is tested and a decision is made, as a function of this memory test, as to the memory from which the data are loaded to influence the processing of the at least one measured value. This allows, in the event of a failure of the rewritable memory, the use of hardwired data which results in reduced accuracy of the measured values but still ensures basic functionality of the crash sensor in such critical sensors. The reliability performance, for example, of an occupant protection system is thus decisively enhanced.

Other memory types, in addition to an EEPROM, may be considered as rewritable memories, specifically other semiconductor memories, which are used as working memories in a computer, for example. A ROM may be considered, for example, as a hardwired memory.

The logic module, which controls the entire crash sensor as a switching mechanism, is preferably provided as an integrated circuit, i.e., as an ASIC. This logic module may also have a plurality of integrated modules or circuits or purely discrete modules. As an alternative, the logic module may also be present as a processor.

The first data from the rewritable memory are used as compensation information to make the sensor more accurate with respect to its sensitivity using these data. The compensation itself has been performed during the manufacture of the crash sensor. The data from this compensation are used from the rewritable memory. Adaptations from the operation of the crash sensor may also be used.

It is advantageous in particular that the test is performed using a check sum. A CRC check sum method (CRC=Cyclic Redundancy Check) is used here for testing our compensation information in the EEPROM.

When saving and transmitting binary data, individual bits may become corrupted by interference. To recognize errors of this type, check bits are appended to the data. By appending more than one check bit, the error recognition rate may be drastically increased. The CRC method represents a method for generating these check bits. The CRC check sum (Cyclic Redundancy Check) is based on interpreting bit strings (i.e., sequences of 0 and 1) as polynomials having the coefficients 0 and 1. For k bits, we thus have k terms from $x^{(k-1)}$ to $x^0$.

EXAMPLE $110001 -> x^5 + x^4 + x^0$

For calculating a CRC check sum, transmitter and receiver must now define a generator polynomial, which must have certain properties (see below). Let this generator polynomial have m bits. The CRC check sum is provided to supplement a given frame of data bits by m bits in such a way that the polynomial of data bits and check sum is divisible by the generator polynomial.

In this case the EEPROM has 32 bits. 24 bits are used for the compensation information; the remaining 8 bits are so-called FCS (Frame Check Sequence) bits, which store the result of the polynomial division of the compensation data used (calculated during the manufacturing of the sensor and written into the EEPROM).

The polynomial is selected in such a way that a maximum Hamming Distance (HD) is achieved. The HD provides the minimum number of bit reversals needed in the data to be monitored for the error not to be found.

In an exemplary sensor, an 8-bit polynomial offering HD=4 is chosen, i.e., all combinations of 1-, 2-, and 3-bit errors are able to be found.

The implemented method has 3 steps:
1. load data: append 8 bits (=0) to the 24-bit compensation data;
2. start polynomial division: implemented in hardware by a shift register;
3. compare data: compare the result of the polynomial division from 2. the FCS bits of the EEPROM. If identical, the corresponding monitor bit "CRC check" in the SPI transmission=0; if different, the monitor bit=1, which may be properly evaluated by the system.

The complete sequence 1-3 is performed every 17 µs.

Advantageously, the first or second data are used for influencing, i.e., establishing, i.e., determining, amplification for the at least one measuring signal and a reference voltage. Further parameters may be established, for example, of a filter as a function of the first or second data. Establishing the amplification factor ultimately results in a desired accuracy of, for example, 5% error rate, while the hardwired value for the amplification will result in an accuracy of only 9% error rate.

It is furthermore advantageous that rapid offset regulation is used in an initial phase to eliminate the offset of the sensor element itself, a so-called raw offset. In a cyclic phase, i.e., in the actual working phase of the sensor, a slow offset regulation is used for eliminating a drift which often occurs in semiconductor elements. An offset regulation is a simple regulating circuit whose speed may be influenced in a known manner. This regulation may be performed by software and/or hardware. The initial phase is the startup phase of the sensor, while the cyclic phase, as indicated above, is the working phase of the sensor.

The sensor advantageously transmits the test result over an interface. A microcontroller in an airbag control unit, for example, may thus become informed about the state of the sensor. In addition to this result, the crash sensor of course also transmits its sensor values to the microcontroller for further processing.

If an error occurs during the cyclic phase, this results in a change in the level, which may be interpreted as a measuring signal. To prevent this from happening, such an error may be suppressed by preventing the measured values from being further transmitted by the sensor or from being accepted by the processor. Overwriting these measured values is also possible, so that only the updated values are transmitted for a predefined time period.

Exemplary embodiments of the present invention are depicted in the drawing and explained in more detail in the description that follows.

BRIEF DESCRIPTION OF THE DRAWINGS

FIG. 5 shows another acceleration-time diagram, including sensor initialization with EEPROM error during the initial phase;

FIG. 6 shows another acceleration-time diagram, including sensor initialization with EEPROM error during the cyclic phase;

FIG. 7 shows an alternative approach, including uncompensated voltage reference, sensor initialization with EEPROM error during the cyclic phase.

DETAILED DESCRIPTION

A crash sensor measures a physical quantity and transmits it to a central computing or regulating unit. The basic accuracy of the sensors may be brought to the required accuracy of the individual parameters via compensation. In the case of the airbag systems, the central and peripheral sensors are generally compensated regarding their sensitivity, so that the tolerance of these parameters is in the required range. To store the compensation information in the sensor in a non-volatile manner, different types of memory cells are used on the integrated circuit of the sensor, i.e., on the logic module, for example, ZAP diodes or EEPROM.

In the event of failure of the memory cell containing the compensation information, this is generally detected initially or cyclically by the appropriate monitoring mechanisms such as a check sum test.

According to example embodiments of the present invention, a selection is made as a function of this test whether first data from a rewritable memory or second data hardwired in a second memory are used for influencing the processing of at least one measured quantity. In the event of a failure of the rewritable memory, data from a hardwired memory may be used to continue to ensure basic functionality of the sensor and prevent sensor failure.

Figure 1:
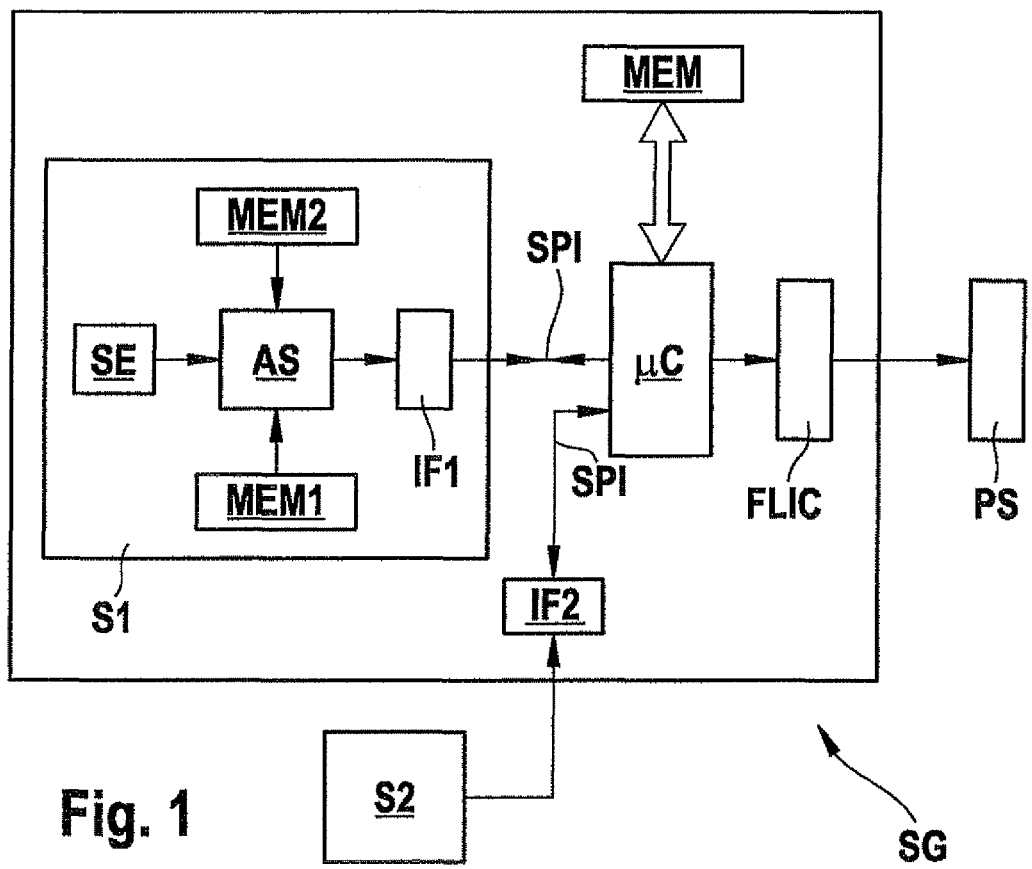
FIG. 1 shows a block diagram including the crash sensor according to an example embodiment the present invention.

FIG. 1 shows a block diagram of the crash sensor according to example embodiments of the present invention in a control unit SG for triggering occupant protection means PS such as airbags, seatbelt tensioners, rollover bars, or pedestrian protection means. A crash sensor S1 is situated in control unit SG. This sensor S1 has a sensor element SE which has been manufactured micromechanically and emits a capacitive signal due to an acceleration, the signal being converted to a voltage and then amplified, This takes place in logic module AS, which has a plurality of functions. In particular, logic module AS, to which the signal of sensor element SE is connected is equipped with a measuring amplifier and further signal processing functions. Logic module AS now performs a test to check sensor S1. If an error is detected in memory MEM1, logic module AS loads the data from hardwired memory MEM2 for processing the at least one measured value of sensor element SE. However, if no error is detected in the check sum test of memory MEM1, which is designed here as an EEPROM, the data for processing the measured value are loaded from memory MEM1, which contains the entire compensation information and also information about the reference voltage to be set. An accuracy of 5% may thus be achieved, while only an accuracy of 9% is possible using the basic functionality and the data from hardwired memory MEM2. In this case, substantially the measuring amplifier is influenced. The signals thus amplified and, if necessary, filtered and digitized, are then transmitted from sensor S1 to a microcontroller µC in control unit SG, over an SPI line and via an interface IF1, which is designed here as an integrated module. In addition to the sensor values, information about the functionality of sensor S1 in control unit SG, i.e., whether there is a 5% or a 9% sensitivity, is transmitted. Microcontroller µC may respond accordingly when its triggering algorithm is set. The sensor values of sensor S1 are used in this algorithm. Since sensor S1 is an acceleration sensor here, sensor element SE may be sensitive in one dimension, for example, in the vehicle's longitudinal direction, as well as, additionally or alternatively, in other sensitivity axes. Microcontroller µC may also call different states via the SPI bus. These include, for example, which functionality is to be used and which offset setting is to be used. Logic module AS has two offset regulations. The first offset regulation is used in the so-called initial phase or power-up phase or start phase. The function of this rapid offset regulation is to eliminate the raw offset of the sensor element. After the initial phase is completed, the cyclic phase or working phase of the sensor follows in which sensor S1 is to deliver its sensor values. A slow offset regulation is used here, which has the function of eliminating drift effects which may occur in this sensor S1. Drift effects during the cyclic phase are caused mainly by temperature changes in the system. The slow offset regulation compares the initial value of the sensor with the zero state every second in principle. If the output signal is greater than 0LSB, then 1LSB is deducted; if the output signal is less than 1LSB, 1LSB is added. The offset regulation may be analog or digital.

Microcontroller µC, which may also be replaced by any other processor type or application-specific circuit, is connected, via a data input/output, to a memory MEM, from which microcontroller µC loads the triggering algorithm it uses to function as a working memory. Microcontroller µC determines, as a function of the sensor values, whether a trigger signal is to be generated. However, microcontroller µC also uses signals from sensors outside of control unit SG for this purpose. An external sensor S2 is connected via another interface module IF2. This may be an acceleration sensor, a structure-borne noise sensor, or a pressure sensor. As a crash sensor, this sensor features example embodiments of the present invention.

If microcontroller µC transmits a trigger signal to a trigger circuit FLIC, this trigger circuit FLIC is responsible for triggering occupant protection means such as airbags or seatbelt tensioners or rollover bars.

In addition to the above-mentioned acceleration pressure sensors or structure-borne noise sensors, yaw rate sensors or other crash sensors may of course also be used.

Logic module AS now checks memory MEM1, which has a rewritable design and is designed here as an EEPROM, using a test according to the present invention. Logic module AS uses a check sum method for this purpose as described above. If logic module AS determines that there is an error in the EEPROM, logic module AS loads the data for influencing the analysis of the measured values of sensor element SE from memory MEM2 in which the data are hardwired. If this effect occurs during a work phase, this may result in a sudden change in the signal, which is transmitted to microcontroller μC as a sensor value. For this purpose, it may be provided that microcontroller μC is made aware of this effect, so that this sudden change does not result in the occupant protection means being triggered.

In the case of an error in the EEPROM during the working phase (the transition from the initial phase to the working phase is given by the FOP instruction "End of Programming," which is transmitted to all SPI nodes in the airbag system), the NRO bit (Non-Regular Operation) transmitted in the SPI data transmission together with the sensor data=0; in the case of a deviation, the NRO bit 1, which indicates an error and the data are not analyzed/are discarded as a system response. In addition, if the error is indicated for a longer time period, after a certain time (error qualification time, presently 1 s for NRO errors), an error is entered in the error memory of the control unit.

Figure 2:
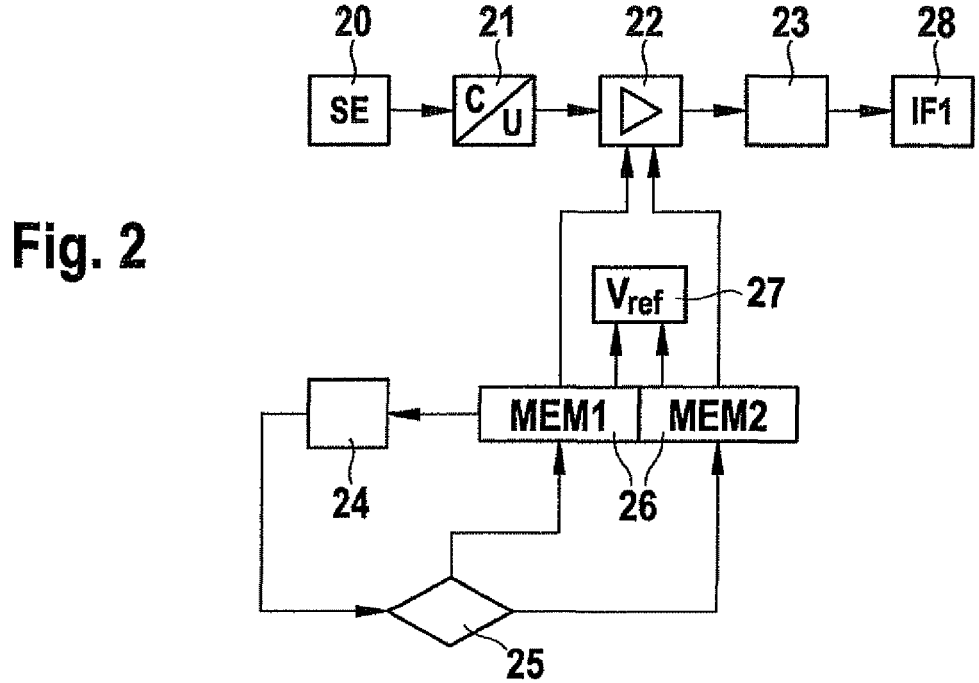
FIG. 2 shows a signal sequence diagram.

FIG. 2 explains an example embodiment according to the present invention in a signal sequence diagram. Sensor element 20 is connected to a capacitance-voltage converter 21, which converts the change in capacitance occurring as a result of an acceleration into a voltage. This voltage is then amplified in an amplifier 22. Filter means may be provided upstream or downstream from amplifier 22. This amplifier 22 is influenced by data from either memory MEM1 or MEM2 as a function of data. This is indicated in block 26. Offset regulation 23, which is rapid offset regulation in the initial phase and slow offset regulation in the cyclic phase as described above, is performed downstream from amplifier 22. Downstream from the offset regulation, these data are then transmitted to microcontroller μC via interface IF1 in block 28. At the same time, however, in block 24 the above-mentioned check sum test runs in sensor S1. The test result is analyzed in block 25. As a function of this test result, memory block 26 is then triggered, so that, as a function of this test, the appropriate data are loaded from memory MEM1 or MEM2 to influence amplifier 22 in such a way that either the data are loaded from memory MEM1 in the case of error-free operation to achieve an accuracy of 5% in the present case or, in the event of an error, the data are loaded from memory MEM2 to achieve basic functionality of 9% accuracy. In addition, reference voltage 27 is established as a function of the test signal.

Figure 3:
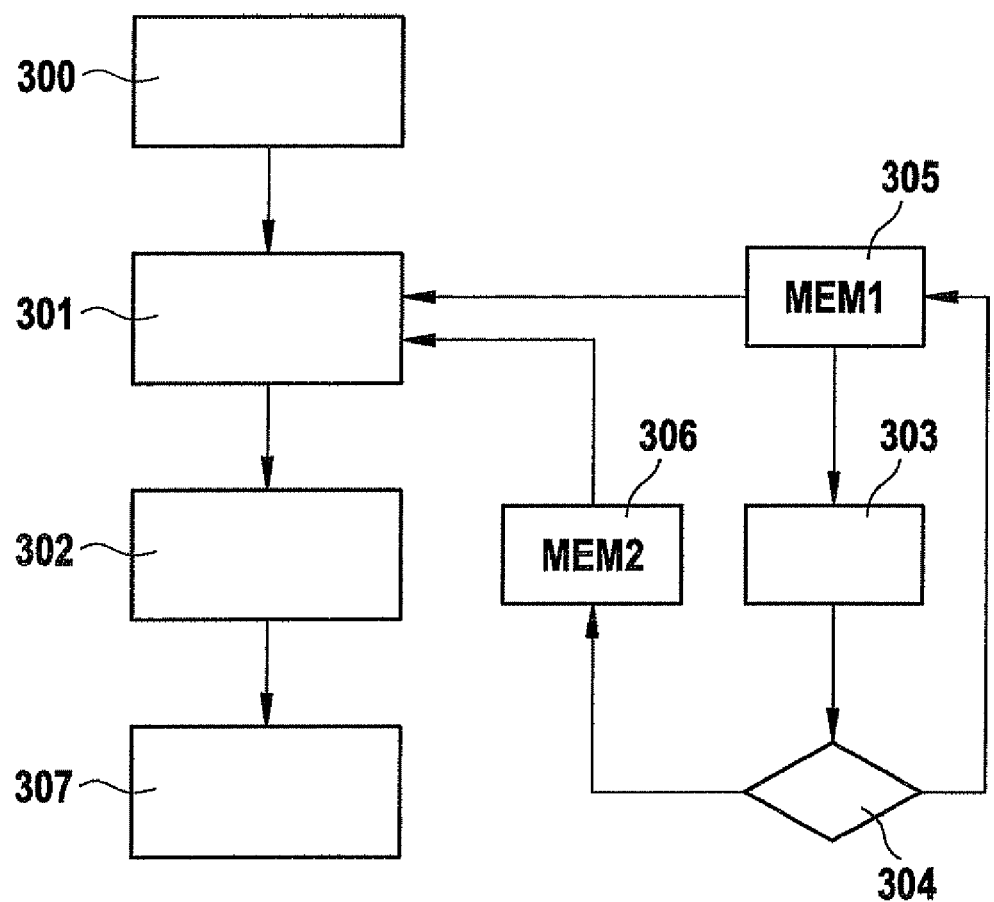
FIG. 3 shows a flow chart.
Figure 4:
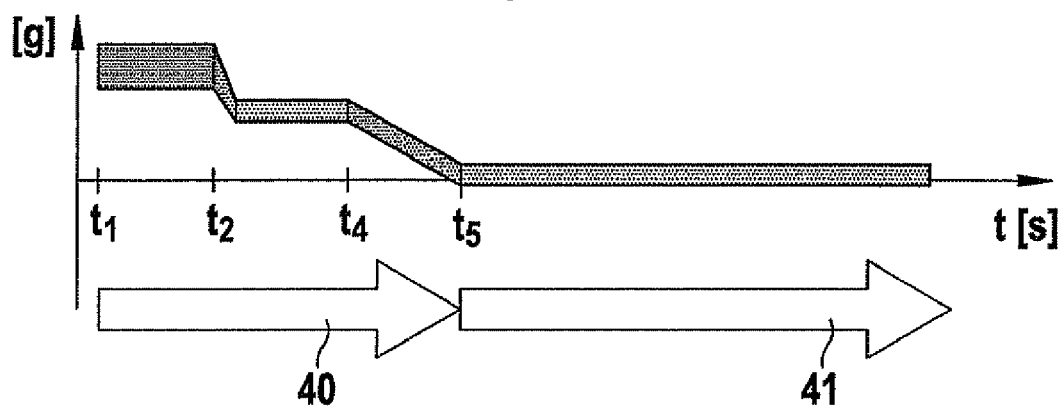
FIG. 4 shows a first acceleration-time diagram, including sensor initialization without EEPROM error.

FIG. 3 explains the method according to example embodiments of the present invention in a flow chart. In method step 300, the measured value is detected by sensor element SE. This measured value is converted as illustrated above in method step 301 into a voltage, which is then amplified. This voltage is established with the aid of data from memory M1 or M2. This then determines the accuracy of the value. In method step 302, the rapid offset regulation is performed in the initial phase or the slow offset regulation is performed in the cyclic phase. In method step 303, the test of memory MEM1, i.e., of the rewritable memory, is performed with the help of the check sum. Instead of a check sum, other test methods which are suitable here may also be used. In method step 304 a check is performed to determine whether the test was successful. If the test was successful, the data are loaded from memory MEM1 in method step 305 to set the gain for the measured values accordingly. The reference voltage is also set accordingly. The reference voltage is used for the complete circuit. If the test was unsuccessful, in method step 306 the data are loaded from hardwired memory MEM2 to influence the amplifier and the reference voltage. After offset regulation 302, the measured values are transmitted in method step 307, where status signals such as a test result are also transmitted. FIG. 4 shows a first acceleration-time diagram of acceleration sensor S1. This curve represents a signal without error in memory MEM1. In initial phase 40, at point in time t1 the power is switched on, activating sensor S1. Up to time t2, there is a certain offset, i.e., a signal having an accuracy of ±9%, which in this case characterizes the sensor element. At point in time t2, compensation data are read from memory MEM1, i.e., the EEPROM. Subsequently, between t2 and t4, a test of this memory MEM1 is performed. A sudden change in the signal occurs due to the compensation data, specifically, a negative change and an increased accuracy of ±5%, which is indicated by the now gray color. At point in time T4, the rapid offset regulation is activated, resulting in the output signal being regulated to 0. This initial phase is concluded by point in time t5, and the rapid offset regulation is switched off. Starting at t5, the slow offset regulation is performed to eliminate drift effects. The cyclic phase is labeled here by reference numeral 41.

FIG. 5 shows sensor initialization with an error in memory MEM1 during the initial phase. The same times are identified here with the same reference symbols as in FIG. 4. At point in time t1, the power is switched on again, and at point in time t2 the compensation data are loaded from memory MEM1. This causes a sudden change in the signal and increased accuracy again. At point in time t3, however, an error in memory MEM1 is established by the tests performed. This results in a sudden change in the accuracy and in the signal because the compensation data are now loaded from memory MEM2. The system thus reverts to the basic functionality of sensor S1. At point in time t4 rapid offset regulation is activated again, resulting in adjustment of the signal, the accuracy of ±9% now being maintained even in cyclic phase 51.

FIG. 6 shows sensor initialization with the error in memory MEM1 during cyclic phase 61. In initial phase 60 the same function as in FIG. 4 occurs up to point in time t5 However, an error is now detected again in cyclic phase 61 at point in time t3. Therefore a sudden change in the signal and a deterioration in the accuracy to 9% occur again due to the data for basic functionality being loaded. This must be communicated to microcontroller μC again, for the latter to take the modified signals into account in its control algorithm.

Finally, FIG. 7 shows the same situation as in FIG. 6, except that an uncompensated voltage reference is now used, which has a higher accuracy due to technological improvements. Therefore, a level offset does not occur, but only a deterioration in the sensitivity to ±9%. The initial phase is labeled here by reference numeral 70 and the cyclic phase by reference numeral 71.

The accuracies of 5% and 9% are given here as examples only; other accuracies may also be used depending on the sensor system.

What is claimed is:

1. A crash sensor, comprising:
   a sensor element adapted to detect at least one measured quantity;
   a first, rewritable memory storing first data configured to influence a processing of the at least one measured quantity, wherein the first data is stored during at least one of (a) a time of manufacture of the crash sensor, and (b) an adaptation in which the first data is adapted in response to operation of the crash sensor;
   a second memory storing second data configured to influence the processing, wherein the second data is stored in a hard-wired manner and differs from the first data with respect to (i) a degree to which the first data and the second data influence an amplification of the at least one measured quantity, and (ii) a degree to which the first data and the second data influence a reference voltage of a circuit on which the crash sensor is located, and wherein the degree of the second data to influence the amplification of the at least one measured quantity and the reference voltage provides for less accurate processing of the at least one measured quantity compared to the first data; and a logic module configured to load one of (a) the first and (b) the second data to a microcontroller, as a function of a test of the first memory, for processing the at least one measured quantity.

2. The crash sensor according to claim 1, wherein the logic module is configured to perform the test using a check sum.

3. The crash sensor according to claim 1, wherein the crash sensor has a rapid offset regulation for eliminating an offset of the sensor element and a slow offset regulation for eliminating a drift, the logic module being configured to use the rapid offset regulation in an initial power-up phase and the slow offset regulation in a cyclic phase following the power-up phase.

4. The crash sensor according to claim 1, wherein the crash sensor has an interface over which the crash sensor sends a test result.

5. A method for processing at least one measured quantity of a crash sensor, comprising:
    detecting the at least one measured quantity;
    testing a first, rewritable memory;
    loading one of (a) first and (b) second data as a function of the test to a microcontroller, the first data being stored in the first memory and the second data being stored in a hardwired manner in a second memory, wherein:
        the first data is stored during at least one of (a) a time of manufacture of the crash sensor, and (b) an adaptation in which the first data is adapted in response to operation of the crash sensor; and
        the second data differs from the first data with respect to (i) a degree to which the first data and the second data influence an amplification of the at least one measured quantity, and (ii) a degree to which the first data and the second data influence a reference voltage of a circuit on which the crash sensor is located, and wherein the degree of the second data to influence the amplification of the at least one measured quantity and the reference voltage provides for less accurate processing of the at least one measured quantity compared to the first data; and
    influencing the processing of the microcontroller by the loaded one of (a) the first and (b) the second data.

6. The method according to claim 5, wherein the test is performed using a check sum.

7. The method according to claim 5, wherein a transmission of the processed at least one measured value is suppressed for a predefined period of time if the test indicates an error in a cyclic phase.

8. The method according to claim 5, wherein a rapid offset regulation for eliminating an offset of a sensor element is used in an initial power-up phase, and a slow offset regulation for eliminating the drift is used in a cyclic phase following the power-up phase.

* * * * *